United States Patent
Scharer

(10) Patent No.: US 7,124,667 B2
(45) Date of Patent: Oct. 24, 2006

(54) APPARATUS FOR THE CONTROL OF TWO SEPARATE MECHANISMS FOR TRANSLATIONAL MOVEMENT OF THE SAME BAR

(75) Inventor: Rolf Scharer, Orvin (CH)

(73) Assignee: LNS S.A., Orvin (CH)

( * ) Notice: Subject to any disclaimer, the term of this patent is extended or adjusted under 35 U.S.C. 154(b) by 33 days.

(21) Appl. No.: 11/056,236

(22) Filed: Feb. 14, 2005

(65) Prior Publication Data

US 2005/0230894 A1 Oct. 20, 2005

(30) Foreign Application Priority Data

Mar. 8, 2004 (EP) ................... 04100936

(51) Int. Cl.
*B23B 13/00* (2006.01)
(52) U.S. Cl. .............................. 82/127; 414/14; 82/124
(58) Field of Classification Search .................. 82/127, 82/126, 125, 124; 29/38 R, 563; 414/14, 414/17

See application file for complete search history.

(56) References Cited

U.S. PATENT DOCUMENTS 4,533,034 A * 8/1985 Gregg ..................... 198/465.1
5,320,008 A * 6/1994 Cucchi ......................... 82/126
5,421,229 A * 6/1995 Grossmann et al. .......... 82/124
5,662,014 A 9/1997 Link
6,178,615 B1 * 1/2001 Ohnishi et al. ................ 29/558
6,302,003 B1 * 10/2001 Haller et al. .................. 82/1.11

FOREIGN PATENT DOCUMENTS

EP 1 291 127 A1 3/2003
EP 1 396 300 A1 3/2004

* cited by examiner

*Primary Examiner*—Willmon Fridie, Jr.
(74) *Attorney, Agent, or Firm*—Oliff & Berridge, PLC

(57) ABSTRACT

Apparatus for the control of two translational movement mechanisms of a bar, including a first translational movement mechanism (6) situated in a machine tool (4) for turning, and a second translational movement mechanism (18) situated in an installation (1) for sequential Loading of such bars (2) into the machine tool (4), characterized in that it comprises: a first element (23) consisting of an elongated ruler which includes at least a plurality of marks successively disposed along its longitudinal dimension for defining a given step and indicating distinctly two opposite directions (S1, S2) of reading this first element (23) along its longitudinal dimension, a second element (24) consisting of a detector of marks borne by the first element (23), this second element (24), on the one hand, detecting each step of a relative movement between the first element (23) and the second element (24).

8 Claims, 2 Drawing Sheets

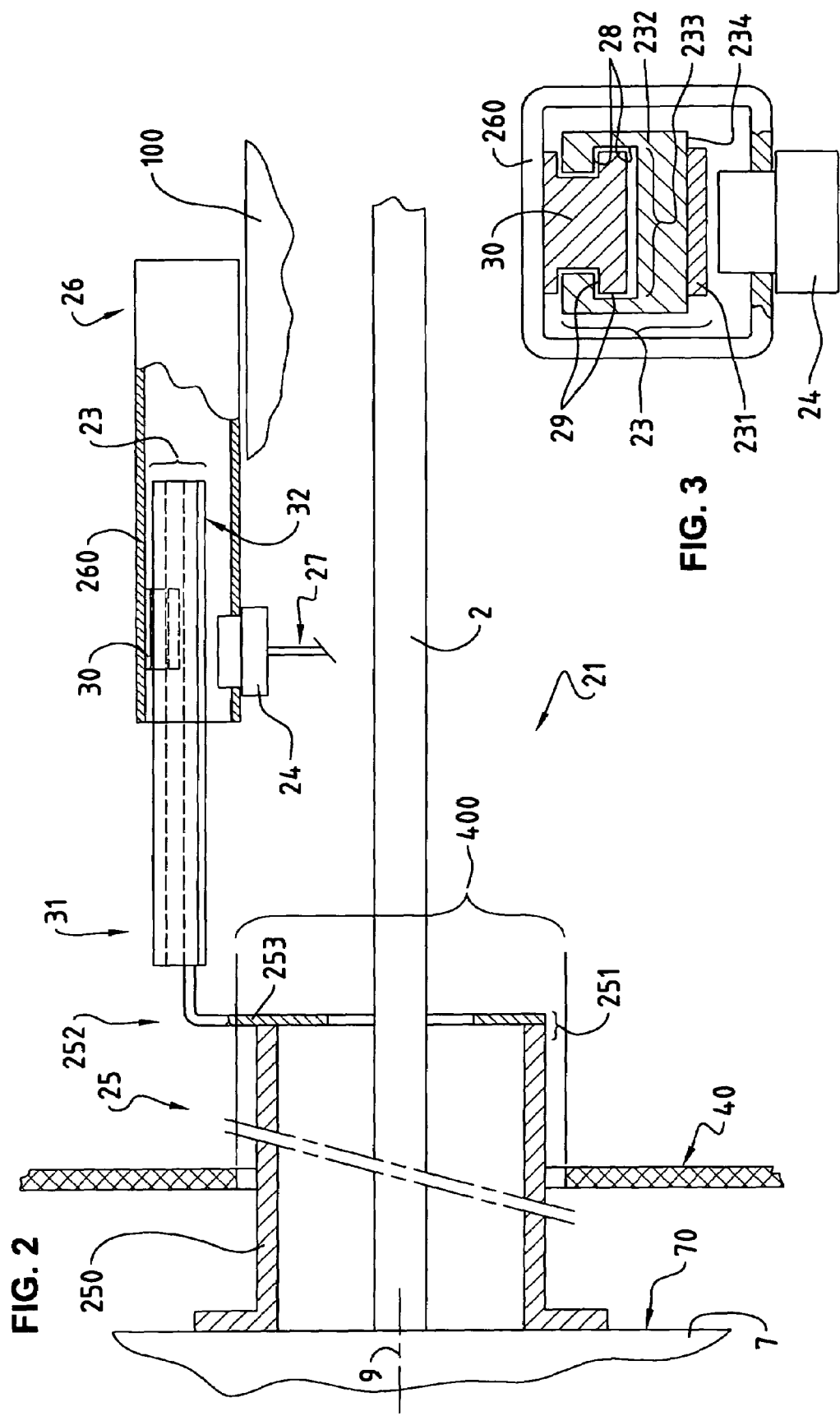

Figure 1:
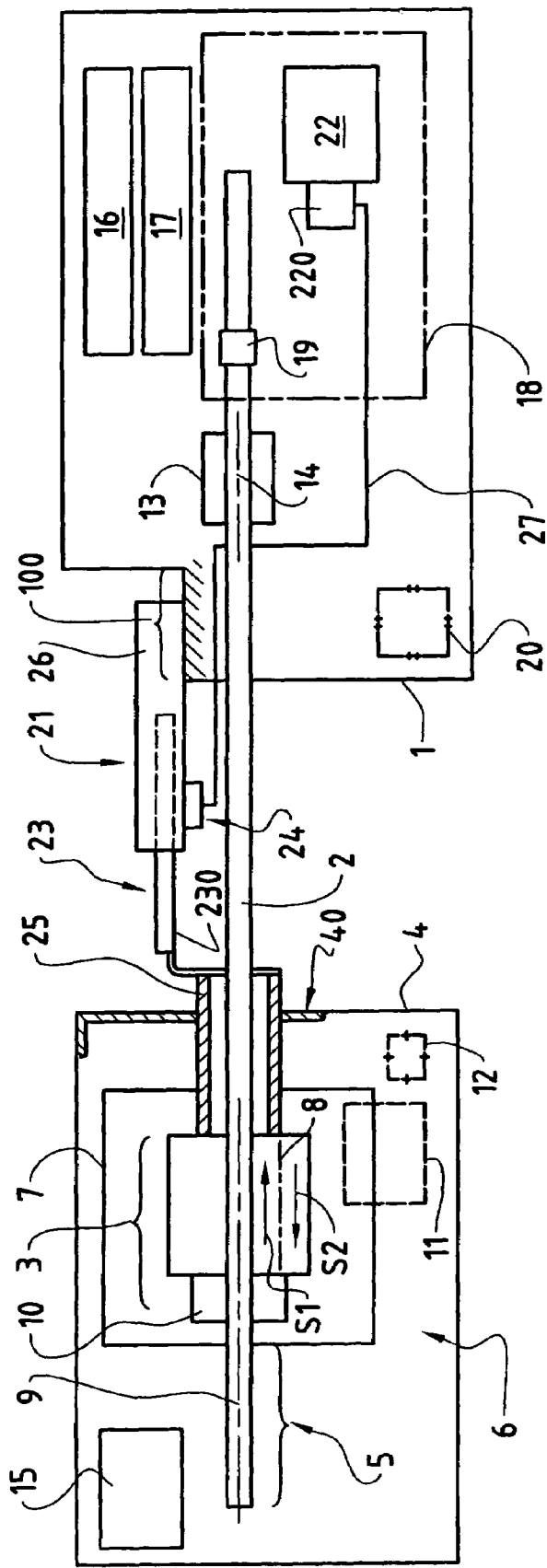

APPARATUS FOR THE CONTROL OF TWO SEPARATE MECHANISMS FOR TRANSLATIONAL MOVEMENT OF THE SAME BAR

The invention relates to an apparatus for the control of two mechanisms for translational movement of a bar, including a first mechanism for translational movement situated in a machine tool for turning, this machine tool being intended to produce, by repetition of a pre-defined machining cycle, a plurality of sectional parts, the length of which corresponds to a fraction of the length of the bar, and a second mechanism for translational movement situated in an installation for sequential loading of such bars in a tubular rotary part of the machine tool for turning.

The invention likewise relates to an assembly which, made up of a machine tool and an installation for loading bars in this machine tool for turning, comprises a control apparatus of the aforementioned type.

In the field of mechanical fabrication, it is known to produce parts on automatic lathes starting from bar stock by carrying out successive machining operations on longitudinal portions of these bars.

It is also known to use a loading installation for placing, then automatically pushing a new bar into the machine tool after a bar has been used up by machining in a machine tool for turning.

The loading installations of the aforementioned type which are used for supplying such automatic lathes, used in industrial production, are known by the name of "feeders."

The invention concerns more particularly, but not exclusively, an apparatus for synchronizing two mechanisms for translational movement of bars, including a first mechanism for translational movement situated in a machine tool for turning called "with adjustable headstock," this machine tool for turning being intended to produce, by repetition of a pre-defined machining cycle, a plurality of sectional parts, the length of which corresponds to a fraction of the length of the bar, and a second mechanism for translational movement situated in an installation for sequential loading of such bars in a tubular rotary part of the adjustable headstock.

A machine tool called "with adjustable headstock" is a machine tool equipped with a first mechanism essentially made up:

of a mechanical assembly which, called adjustable headstock, is guided translationally along an axis of translation on the machine tool, especially on slides, and comprises a tubular part which, driven rotatingly about an axis of rotation parallel to the axis of translation, receives an end portion of the bar and bears a radial holding clamp for this end portion, of a driving means, called first driving means, which is controlled by a first control means, following two opposite directions so that in the course of each machining cycle of a part, while the clamp remains closed, the mechanical assembly, called adjustable headstock, can undergo translational movements, substantially along the axis of this bar.

An installation for loading bars in a machine tool with adjustable headstock must therefore permit such movements of the bar loaded into the machine.

It turns out that an installation for loading bars particularly comprises:

a first device intended to ensure a function combining actions of supporting and of guiding a bar, especially during its rotation, in the course of a translational movement of this bar along a given axis, called guidance axis, especially substantially coaxial with the tubular rotary part of the machine tool which must be traversed by said bar, in order to be presented to a system of tools situated in this machine, a second device intended to ensure a function of storage of a plurality of bars, a third device intended to ensure functions of selection and of withdrawal of a bar from this store, then of placement of this bar in the translational guidance device, a mechanism of translational movement, called second translational movement mechanism, intended to ensure, by means of at least one stop held resting against the bar, functions of translational movement of this bar loaded in the guidance device and, especially, in such a way as to be able to ensure selectively, the movement of this bar, at least in the guidance device, so as to dispose it in a position called awaiting loading, the thrust of the bar, sequentially, both through said guidance device and the tubular rotary part of the machine tool, from said position called awaiting loading until a given number of parts have been made, the extraction from the tubular rotary part of a section of bar which has not been used in the machine tool, the movement of said non-used section to a last position, such as that of a station for removal of this section, a fourth device intended to ensure the programmable control of the aforementioned devices and mechanism.

As has been indicated above, in the case of a machine with adjustable headstock, at the time of machining, the translational movements of the adjustable headstock bring about the movement of the bar, without the knowledge of [sic-like?] said second mechanism of translational movement within the loading installation.

When the bar has a small cross-section, it is particularly subject to bending, even buckling, at the time of the retraction of the headstock.

The designers of loading installations which must be used for loading bars in machine tools with adjustable headstock have had to provide a technical solution which permits traversing of the bar in the loading installation, under the influence of the movements of the adjustable headstock.

One known technical solution consists, on the one hand, in making a rigid connection between the adjustable headstock and an active element of the second translational movement mechanism within the installation and, on the other hand, in placing this connection under the control of a controlled release means, so that only the retracting movements of the adjustable headstock are transmitted to the second translational movement mechanism within the loading installation.

It turns out that the release sought is obtained only after a relatively long reaction time, which may produce jolts harmful to the quality of the machining and/or to the operation of the various devices and mechanisms involved, whether in the loading installation or in the machine tool.

One result which the invention aims to obtain is an apparatus which allows these drawbacks to be remedied.

To this end, the subject of the invention is an apparatus for the control of two mechanisms for translational movement of a bar, including a first mechanism for translational guidance essentially made up:

of a mechanical assembly called adjustable headstock which is translationally guided along an axis of translation on the machine tool, especially on slides, and comprises a tubular part which, driven rotatingly about an axis of rotation parallel to the axis of translation, receives an end portion of the bar and bears a radial holding clamp for this end portion, of a driving means called first driving means, which is controlled by a first control means, following two opposite directions, so that in the course of each machining cycle of a part, while the clamp remains closed, the mechanical assembly, called adjustable headstock, may be caused to move translationally, substantially along the axis of this bar, a second translational guidance mechanism, intended to ensure functions of translational movement of a bar so as to be able to obtain, especially, the thrust of the bar, sequentially, through the tubular rotary part, until a given number of parts have been made, the second translational movement mechanism within the loading installation comprising a driving means, called second driving means, of the type controlled by steps.

Remarkably, the apparatus according to the invention comprises:

a first element consisting of an elongated ruler which includes a plurality of marks successively disposed along its longitudinal dimension for defining a given step and indicating distinctly two opposite directions of reading this first element along its longitudinal dimension, a second element consisting of a detector of marks borne by the first element, this second element, on the one hand, detecting each step of a relative movement between the first element and the second element, as well as the direction of this movement and, on the other hand, developing a signal of step and of direction of movement, a third element and a fourth element, each for fixing of one of said first element and second element, one on the adjustable headstock, the other on a stationary part of the loading installation, said third element and fourth element being disposed in such a way that any translational movement of the adjustable headstock brings about a relative translational movement between the first element and the second element, which is of identical value and identical direction to those of the relative movement of this adjustable headstock, a fifth element for applying to said second driving means of the second mechanism of movement of the loading installation the signal of step and of direction of movement developed at the level of the second element so as instantly to control said second driving means of the loading installation according to each step detected and to the direction of movement detected.

The subject of the invention is also an assembly made up of a machine tool and an installation for loading bars into this machine tool, this assembly being remarkable in that it comprises a control apparatus of the aforementioned type.

The invention will be well understood upon reading the following description given by way of non-limiting example, in comparison with the enclosed drawing which shows diagrammatically:

FIG. 1, seen in section along a vertical longitudinal plane, an assembly comprising a machine tool with adjustable headstock and an installation for loading bars into this machine tool, the installation and the machine being equipped with an apparatus according to the invention, FIG. 2, seen in partial longitudinal section and on a larger scale, an apparatus according to the invention, FIG. 3, a cross-section on a larger scale of a functional portion of the apparatus shown in FIG. 2.

Referring to the drawing, there is seen an installation for sequential loading of bar stock 2 into a tubular rotary part 3 of a machine tool 4 for machining these bars 2, such as a machine tool for turning, so as to produce, by repetition of a pre-defined machining cycle, a plurality of sectional parts 5, the length of which corresponds to a fraction of the length of the bar 2.

The installation for sequential loading of bar stock 2 is hereinafter called loading installation 1.

The machine tool 4 is a machine tool called "with adjustable headstock," viz., a machine tool 4 equipped with a mechanism 6 for translational movement, called first translational movement mechanism 6, essentially made up:

of a mechanical assembly which, called adjustable headstock 7, is guided translationally on the machine tool 4 along an axis of translation 8, especially on slides (not shown), and comprises a tubular part 3 which, driven rotatingly about an axis of rotation 9 parallel to the axis of translation, receives an end portion of the bar 2 and bears a clamp 10 for holding this end part radially, of a driving means 11 which, called first driving means 11, is controlled by a first control means 12, following two opposite directions S1, S2, so that in the course of each machining cycle of a part 5, while the clamp 10 remains closed, the mechanical assembly, called adjustable headstock 7, can undergo translational movements, substantially along the axis of translation 8.

The loading installation 1 of bars 2 comprises, advantageously but not limitatively:

a first device 13, called of translational guidance, intended to ensure a function combining actions of support and of guidance of a bar 2, especially during its rotation, in the course of a translational movement of this bar 2 along a given axis 14, called guidance axis 14, especially substantially coaxially with that 9 of the tubular rotary part 3 of the machine tool 4 which must be crossed by said bar 2 in order to be presented to a system of tools 15 situated in this machine tool 4, a second device 16 intended to ensure a function of storage of a plurality of bars 2, a third device 17 intended to ensure functions of selection and of withdrawal of a bar 2 from the second device 16 called storage device, then of placement of this bar 2 in the first device 13 called of translational guidance, a translational movement mechanism 18, called second translational movement mechanism 18 and, intended to ensure functions of translational movement of the bar 2 loaded in the first translational guidance device 13 and, especially, so as to be able, by means of at least one stop 19 held resting against this bar 2, to obtain selectively, the movement of this bar 2, at least in the first translational guidance device 13, so as to dispose it in a position called awaiting loading, the thrust of the bar 2, sequentially, both through said first translational guidance device 13 and the tubular rotary part 3, from said position called awaiting loading until a given number of parts have been made, the extraction from the tubular rotary part 3 of a section of bar 2 which has not been used in the machine tool 4, the movement of said non-used section of bar 2 to a station of removal of this section of bar 2, a fourth device 20 intended to ensure the programmable control of the devices 13, 16, 17 which are called first (13), second (16), and third (17), as well as of the aforementioned translational movement mechanism 18.

This description allows it to be better understood that a loading installation 1 consists of a complex electromechanical assembly, the operation of which is liable to be especially disturbed, even altered, by outside actions, such as movement actions imposed upon the bar 2 by an adjustable headstock 7, in the course of a machining cycle of a part 5.

Machining cycle is intended to mean a succession of machining operations which are carried out by relative movements between the bar 2 and at least one tool of a system of tools 15 situated in the machine tool 4.

In the case of the invention, it shall be considered that the loading installation 1 comprises, as a minimum, at least one translational movement mechanism 18, called second translational movement mechanism 18, intended to ensure functions of translational movement of a bar 2 so as to be able, especially by means of at least one stop 19 held resting against this bar 2, to obtain, especially, the thrust of the bar 2, sequentially, through the tubular rotary part 3, until a given number of parts 5 have been made.

As has been announced, the invention relates to an apparatus 21 which allows translations of the bar 2 in the loading installation 1, under the influence of the movements of the adjustable headstock 7, without the known drawbacks resulting therefrom.

The second translational movement mechanism 18, within the loading installation 1, is of the type including a driving means 22 of the type controlled by steps, known by the name of servomotor.

Remarkably, the apparatus 21 according to the invention comprises:

a first element 23 consisting of an elongated ruler which includes at least a plurality of marks 230 successively disposed along its longitudinal dimension for defining a given step and indicating distinctly two opposite directions S1, S2 of reading this first element along its longitudinal dimension, a second element 24 consisting of a detector of marks 230 borne by the first element 23, this second element 24, on the one hand, detecting each step of a relative movement between the first element 23 and the second element 24, as well as the direction of this movement and, on the other hand, developing a signal of movement step and direction, a third element 25 and a fourth element 26, each for fixing of one of said first element 23 and second element 24, one on the adjustable headstock 7, the other on a stationary part 100 of the loading installation 1, said third element 25 and fourth element 26 being disposed in such a way that any translational movement of the adjustable headstock 7 brings about a relative translational movement between the first element 23 and the second element 24, which is of identical value and identical direction to those of the relative movement of this adjustable headstock 7, a fifth element 27 for applying to said second driving means 22 of the second translational movement mechanism 18, within the loading installation 1, the signal of step and of direction of movement developed at the level of the second element 24 so as instantly to control said second driving means 22 of the loading installation 1 according to each step detected and to the direction of movement detected.

Advantageously, the first element, viz., the ruler, has a step of a hundredth of a millimeter per pulse (advantageously a system with two channels shifted by ninety degrees).

In the drawings, the marks are not shown, and the reference numeral 230 simply suggests their presence on the first element.

The fifth element 27 consists of a means for transmission of the signal of step and direction of movement.

For example, the fifth element 27 consists of one or more cables for electrical connection to a case 220 for controlling the second driving means 22 of the type controlled by steps (servomotor) of said second translational movement mechanism 18 within the loading installation 1.

The stationary part 100 of the loading installation 1 is, for example, constituted by a structural part of this installation.

By virtue of its make-up, the apparatus 21 according to the invention enables the result aimed at to be obtained, viz., a real synchronization of the movements of the adjustable headstock 7 of the machine tool 4 and of the second translational movement mechanism 18 within the loading installation 1.

Hence, the absence is noted of jolts harmful to the quality of the machining and/or to the operation of the various mechanisms involved, whether in the loading installation 1 or in the machine tool 4.

As appears in the drawing, the first element 23, viz., the ruler, is translationally guided in relation to the second element 24, viz., the detector, so as to guarantee its precise positioning at least at the level of said detector.

Since the adjustable headstock 7 is guided translationally, and since the machine tool 4 and the loading installation 1 are stationary relative to one another, the translational guidance of the first element 23 relative to the second element 24 may appear to be superabundant, but in fact, it makes it possible to guarantee . . . [? at all times?] the reliability of the apparatus 21 according to the invention.

According to a preferred embodiment, so as to carry out the translational guidance:

the first element 23, viz., the ruler, on the one hand, has along its longitudinal dimension parallel surfaces 28 intended to co-operate with guidance surfaces 29 of a guidance component, and on the other hand, is rigidly connected to the third element 25 by one of the two ends 31, 32 which it comprises, the fourth element 26 comprises a tubular part 260, on the one hand, in which there is fixed a guidance component 30 of the first element 23 constituted by the ruler and, on the other hand, on this tubular part 260, the second element 24, viz., the detector, is fixed, at substantially the same longitudinal level as the guidance component 30, so as to be held opposite the first element 23 in order to detect the marks 230 borne by the ruler constituting this first element 23.

Still remarkably, the third element 25 and the fourth element 26 support the first element 23, viz., the ruler, and the second element 24, viz., the detector, in the vicinity of the bar 2 which extends between the machine tool 4 and the loading installation 1.

The bar 2 constitutes a physical and psychological obstacle which, in a certain way, enables the ruler and the detector to be preserved from accidental contacts with objects (not shown) manipulated about the machine tool 4 and the loading installation 1.

Preferentially and remarkably:

the first element 23, viz., the ruler, is made up on the one hand, of a functional part 231 which consists of a strip of material including at least a plurality of marks 230 successively disposed along the longitudinal dimension of the strip, for defining a given step and indicating distinctly two opposite directions S1, S2 of reading this strip along its longitudinal dimension, on the other hand, of a structural part 232 which consists of an elongated rigid part of sectional cross-section so as to include, along its longitudinal dimension, a T-shaped groove 233 having parallel surfaces 28, at least some of which are intended to co-operate with guidance surfaces 29 of a guidance par 30, and a free face 234 of sufficient area to receive the strip constituting the functional part 231, the guidance component 30 consists of a part having a T-shaped cross-section complementary to the groove 233 of the structural part 232 of the first element 23, which guidance component 30 extends over a fraction of the longitudinal dimension of the first element 23.

As appears in the drawing, when the adjustable headstock 7 is masked by a part 40 of the machine tool 4 situated toward the loading installation 1, but when this adjustable headstock 7 has a face 70, called rear face 70, which, turned toward the loading installation 1, on the one hand, is intended to be crossed by a bar 2 coming from the loading installation 1 and, on the other hand, appears through a cut-out 400 of the machine tool 4 which is traversed by this bar 2, the third element 25 comprises a rigid tubular brace 250, intended to be fixed to the rear face of the adjustable headstock 7 so as to be traversed by the bar 2, which tubular brace 250 is of a length at least sufficient to have an end 251, called free end 251, which:

is situated outside the machine tool 4 when the rear face 70 of the adjustable headstock 7 is brought into a position of maximum distance from the loading installation 1, bears a fixing zone 252 for at least one of the elements which are the first element 23 and the second element 24, viz., the ruler and the detector.

In a remarkable embodiment, besides the tubular brace 250, the third element 25 comprises a plate 253 which, borne at the free end 251 of this tubular brace 250, on the one hand, is situated in a plane substantially at right angles to a longitudinal axis of said tubular brace 250 and, on the other hand, has the fixing zone 252 for at least one of the elements which are the first element 23 and the second element 24.

As is shown, it is, for example, the first element 23, i.e., the ruler, which is borne by the plate 253 by means of a suitable square brace and fixing part, such as screws.

In the case shown, the second element 24, i.e., the detector, is borne by the tubular part which constitutes the fourth element 26, this fourth element 26 being in turn borne by a stationary part 100 of the loading installation 1, for example, by a structural part of this loading installation 1.

The invention claimed is:

1. Apparatus for the control of two mechanisms for translational movement of a bar, including a first mechanism (6) for translational movement situated in a machine tool (4) for turning, and a second mechanism (18) for translational movement situated in an installation (1) for sequential loading of such bars in a tubular rotary part (3) of the machine tool (4)

said first mechanism (6) being essentially made up:
of a mechanical assembly which, called adjustable headstock (7),
is guided translationally on the machine tool (4), along an axis of translation (8), and
comprises a tubular part (3) which, driven rotatingly about an axis of rotation (9) parallel to the axis of translation (8), receives an end portion of the bar (2) and bears a radial holding clamp (10) for this end portion,
of a driving means (11), called first driving means, which is controlled by a first control means (12), following two opposite directions (S1, S2) so that in the course of each machining cycle of a part (5), the mechanical assembly, called adjustable headstock (7), can undergo translational movements, said second translational movement mechanism (18) being intended to ensure functions of translational movement of a bar (2) so as to be able to obtain, especially, the thrust of the bar (2), sequentially, through the tubular rotary part (3), until a given number of parts (5) have been made, a second translational movement mechanism (18), within the loading installation (1), including driving means (22) of the type controlled by steps, the apparatus (21) for the control of the two mechanisms called first and second being characterized in that it comprises:

a first element (23) consisting of an elongated ruler which includes at least a plurality of marks (230) successively disposed along its longitudinal dimension for defining a given step and indicating distinctly two opposite directions (S1, S2) of reading this first element (23) along its longitudinal dimension, a second element (24) consisting of a detector of marks (230) borne by the first element (23), this second element (24), on the one hand, detecting each step of a relative movement between the first element (23) and the second element (24), as well as the direction of this movement and, on the other hand, developing a signal of step and of direction of movement, a third element (25) and a fourth element (26), each for fixing of one of said first element (23) and second element (24), one on the adjustable headstock (7), the other on a stationary part (100) of the loading installation (1), said third element (25) and fourth element (26) being disposed in such a way that any translational movement of the adjustable headstock (7) brings about a relative translational movement between the first element (23) and the second element (24), which is of identical value and identical direction to those of the relative movement of this adjustable headstock (7), a fifth element (27) for applying to said second driving means (22) of the second translational movement mechanism (18), within the loading installation (1), the signal of step and of direction of movement developed at the level of the second element (24) so as instantly to control said second driving means (22) of the loading installation (1) according to each step detected and to the direction of movement detected.

2. Apparatus according to claim 1, characterized in that the first element (23), the ruler, is guided translationally relative to the second element (24), viz., the detector, so as to guarantee its precise positioning at least at the level of said detector.

3. Apparatus according to claim 2, characterized in that, so as to achieve the translational guidance:

the first element (23), the ruler, on the one hand, has along its longitudinal dimension parallel surfaces (28) intended to co-operate with guidance surfaces (29) of a guidance component, and on the other hand, is rigidly connected to the third element (25) by one of the two ends (31, 32) which it comprises, the fourth element (26) comprises a tubular part (260), on the one hand, in which there is fixed a guidance component (30) of the first element (23) constituted by the ruler and, on the other hand, on this tubular part (260), the second element (24), viz., the detector, is fixed, at substantially the same longitudinal level as the guidance component (30), so as to be held opposite the first element (23) in order to detect the marks (230) borne by the ruler constituting this first element (23).

4. Apparatus according to claim 1, characterized in that the third element (25) and the fourth element (26) support the first element (23), viz., the ruler, and the second element (24), the detector, in the vicinity of the bar (2) which extends between the machine tool 4 and the loading installation (1).

5. Apparatus according to claim 1, characterized in that:
the first element (23), the ruler, is made up
on the one hand, of a functional part (231) which consists of a strip of material including at least a plurality of marks (230) successively disposed along the longitudinal dimension of the strip, for defining a given step and indicating distinctly two opposite directions (S1, S2) of reading this strip along its longitudinal dimension,
on the other hand, of a structural part (232) which consists of an elongated rigid part of sectional cross-section so as to include, along its longitudinal dimension,
a T-shaped groove (233) having parallel surfaces (28), at least some of which are intended to co-operate with guidance surfaces (29) of a guidance component (30), and
a free face (234) of sufficient area to receive the strip constituting the functional part (231),
the guidance component (30) consists of a part having a T-shaped cross-section complementary to the groove (233) of the structural part (232) of the first element (23), which guidance component (30) extends over a fraction of the longitudinal dimension of the first element (23).

6. Apparatus according to claim 1, used with a machine tool (4) including an adjustable headstock (7) which
may be masked by a part (40) of this machine tool (4) situated toward the loading installation (1),
has a face (70), called rear face (70), which, turned toward the loading installation (1), on the one hand, is intended to be crossed by a bar (2) coming from the loading installation (1) and, on the other hand, appears through a cut-out (400) of the machine tool (4) which is traversed by this bar (2), this apparatus being characterized in that the third element (25) comprises a rigid tubular brace (250), intended to be fixed to the rear face of the adjustable headstock (7) so as to be traversed by the bar (2), which tubular brace (250) is of a length at least sufficient to have an end (251), called free end (251), which:
is situated outside the machine tool (4) when the rear face (70) of the adjustable headstock (7) is brought into a position of maximum distance from the loading installation (1),
bears a fixing zone (252) for at least one of the elements which are the first element (23) and the second element (24), the ruler and the detector.

7. Apparatus according to claim 6, characterized in that besides the tubular brace (250), the third element (25) comprises a plate (253) which, borne at the free end (251) of this tubular brace (250), on the one hand, is situated in a plane substantially at right angles to a longitudinal axis of said tubular brace (250) and, on the other hand, has the fixing zone (252) for at least one of the elements which are the first element (23) and the second element (24).

8. Assembly made up of a machine tool and an installation for loading bars into this machine tool for turning, comprising a control apparatus according to claim 1.

\* \* \* \* \*